July 24, 1956  W. F. MUELLER  2,755,809
PIPE LINE CLEANING MACHINE
Original Filed Jan. 13, 1955  5 Sheets-Sheet 1

WILLIAM MUELLER
INVENTOR.

BY
ATTORNEY

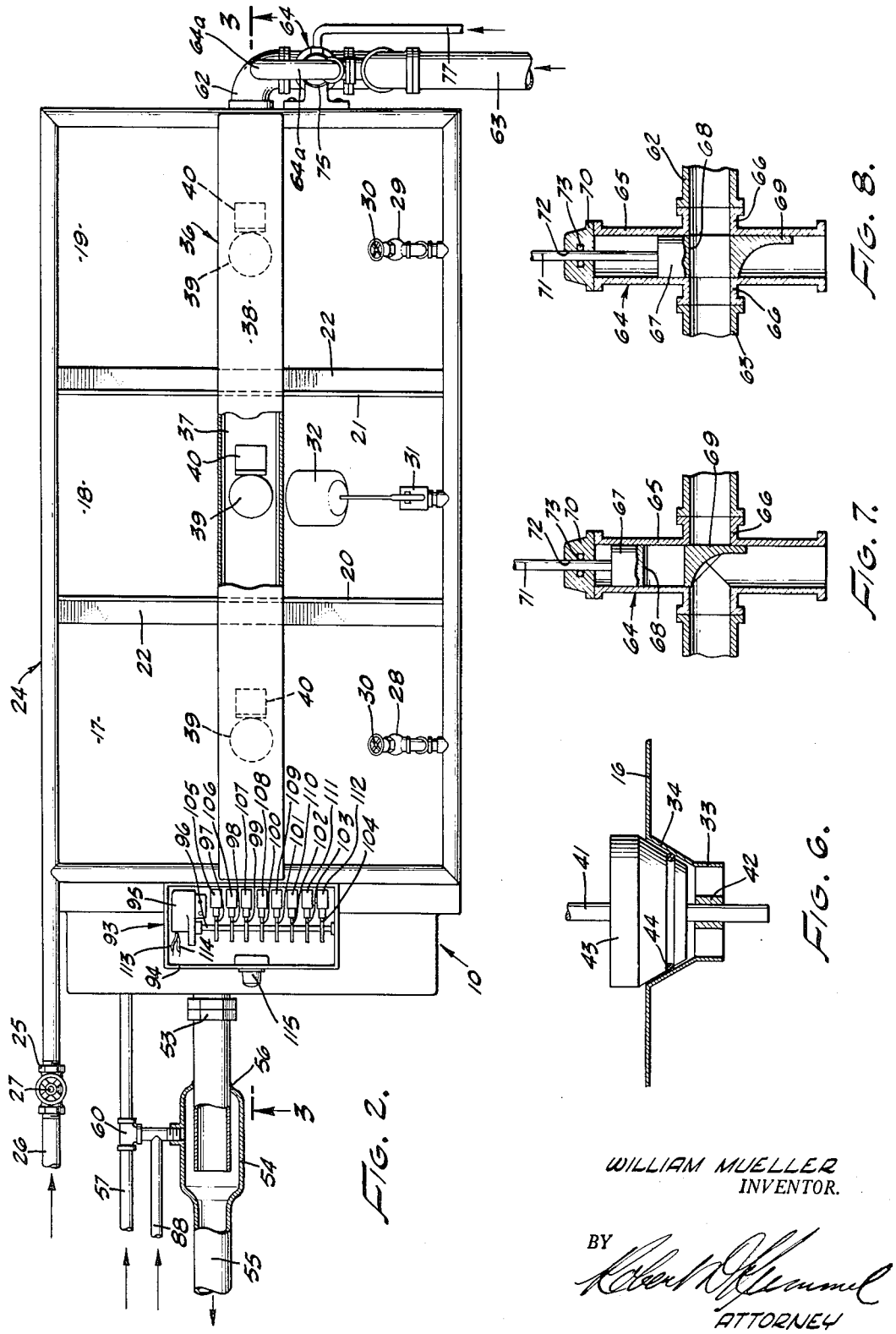

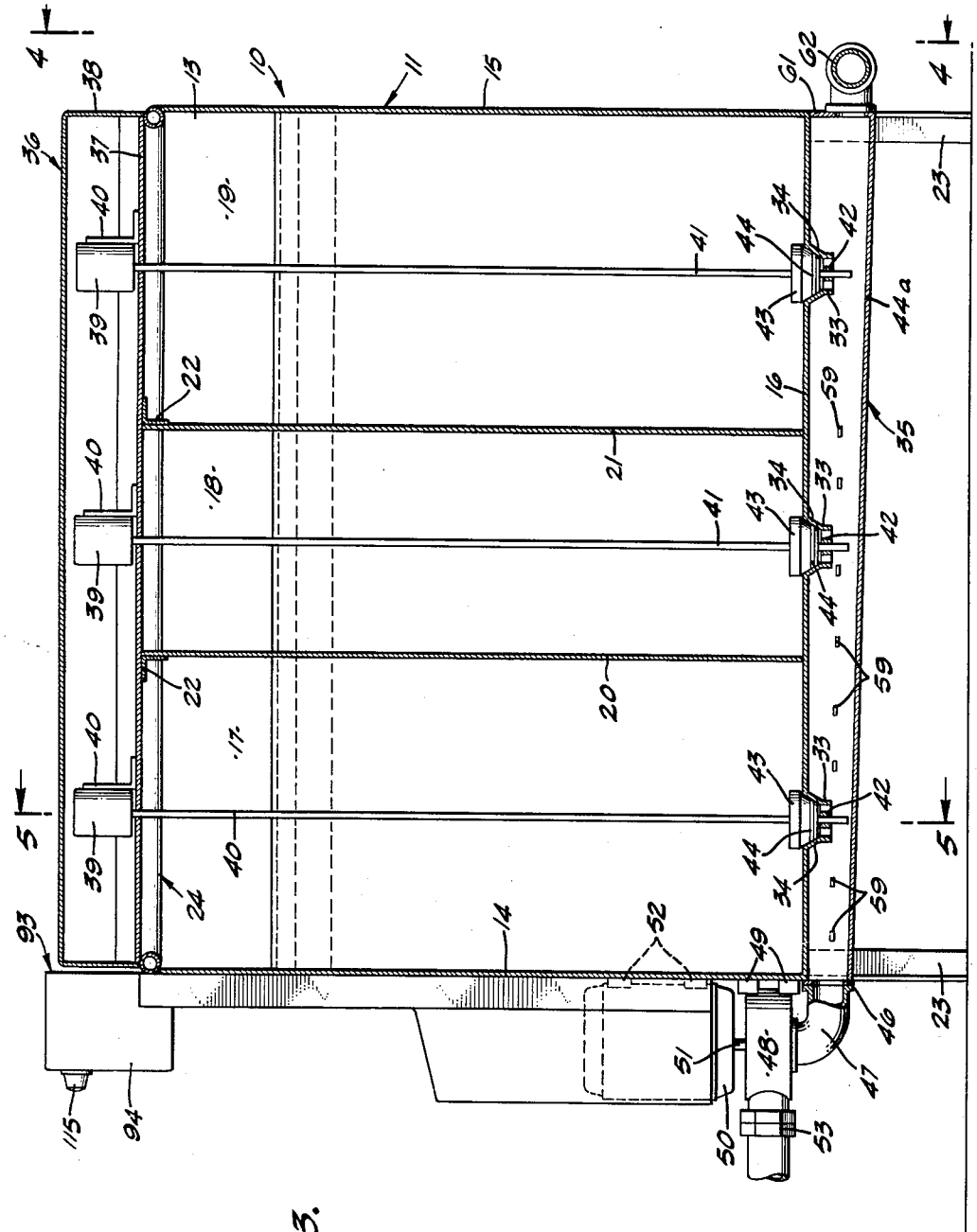

July 24, 1956  W. F. MUELLER  2,755,809
PIPE LINE CLEANING MACHINE
Original Filed Jan. 13, 1955  5 Sheets—Sheet 4

WILLIAM MUELLER
INVENTOR.

BY
ATTORNEY

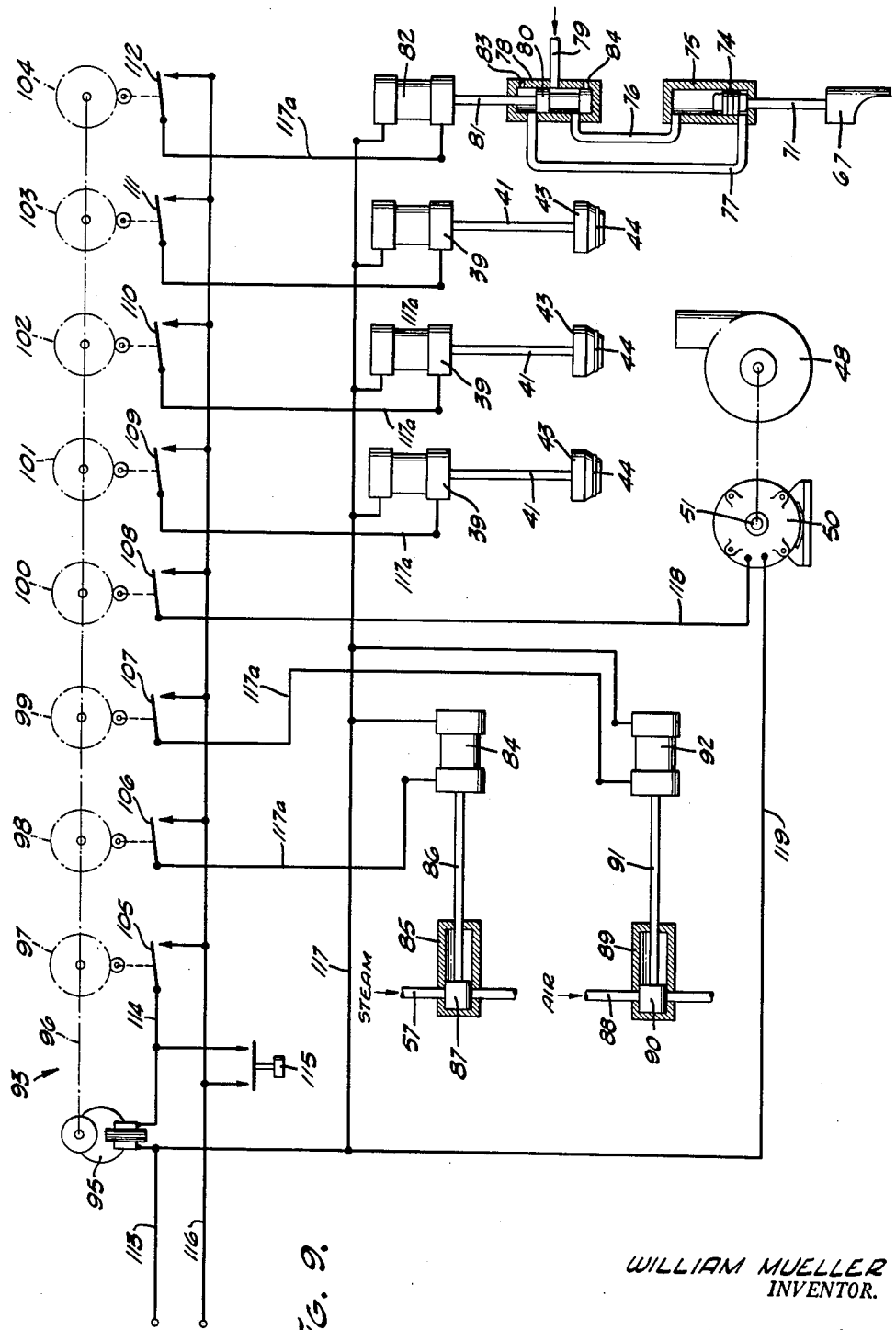

United States Patent Office 2,755,809
Patented July 24, 1956

2,755,809

PIPE LINE CLEANING MACHINE

William F. Mueller, Tarzana, Calif.

Continuation of application Serial No. 481,674, January 13, 1955. This application October 24, 1955, Serial No. 542,393

15 Claims. (Cl. 134—58)

The present invention relates to a pipe line cleaning machine and more particularly to a machine for cleaning a fixed piping network used in food processing, such as, for example, is found in a milk plant or dairy, which automatically effects cleaning of the pipe line in accordance with a predetermined sequence of operation.

Previous methods for cleaning fixed pipe lines in dairies have been subject to a great deal of human inconsistency and required the attendance of an operator to control the necessary machinery for pumping the cleaning solutions and rinsing solutions through the piping. A customary method employed first entailed pumping a predetermined amount of water through the piping network. After the pipe had been flushed with this predetermined amount of water, a suitable detergent was pumped through the piping to clean the same after which more water was pumped through the piping in order to rinse and flush the remaining detergent out of the piping network. The same procedure would then preferably be followed with a chlorine solution which would also be rinsed by a following flushing with water. It will be appreciated that the amount of detergent and chlorine solution pumped through the piping was controlled by the operator and, therefore, the cleaning operation from day to day was subject to a certain amount of inconsistency, and required the attendance of at least one operator at all times. The present invention contemplates a machine which can be set to automatically operate in various predetermined sequences and which will circulate the cleaning and rinsing solutions through the fixed piping in the same cycle or sequence of operation day after day and week after week when the controls have been adjusted for effecting a predetermined cycle of operation.

It is, therefore, a primary object of the present invention to provide a machine for cleaning fixed piping which is automatic in operation and which can be set to circulate cleaning and water solutions through the fixed piping in predetermined cycles of operation.

A further object of the present invention is to provide a machine for cleaning fixed piping which will circulate through the piping a detergent, water and chlorine solution in predetermined cycles of operation.

Another object of the present invention is to provide a machine for automatically cleaning fixed piping which returns the cleaning solutions to the machine after the same have been circulated through the piping and which causes the piping to be thoroughly rinsed after cleaning and the rinse water to be discharged into a suitable drain.

A still further object of the present invention is to provide a machine for cleaning fixed piping which can be adjusted to operate automatically in a great number of predetermined cleaning cycles.

A further object of the present invention is to provide a machine for cleaning fixed piping which is pleasing in appearance, which operates with a high degree of efficiency, and which can be manufactured easily and inexpensively.

Referring to the drawings:

Fig. 2 is a plan view of the machine shown in Fig. 1 with parts broken away to show details of construction and with parts removed.

Fig. 3 is a vertical sectional view taken on the line 3—3 of Fig. 2 with parts broken away.

Fig. 6 is an enlarged fragmentary view of certain structure shown in Fig. 3.

Fig. 7 is a fragmentary vertical sectional view of the valve shown in Fig. 4, showing the valve in its discharge position, slightly enlarged.

Fig. 8 is a view similar to Fig. 7 showing the valve in its non-discharge position.

Fig. 9 is a wiring diagram showing a sequence timer interconnected to the various instrumentalities of the present invention for effecting a predetermined sequence of operation.

Figure 1:
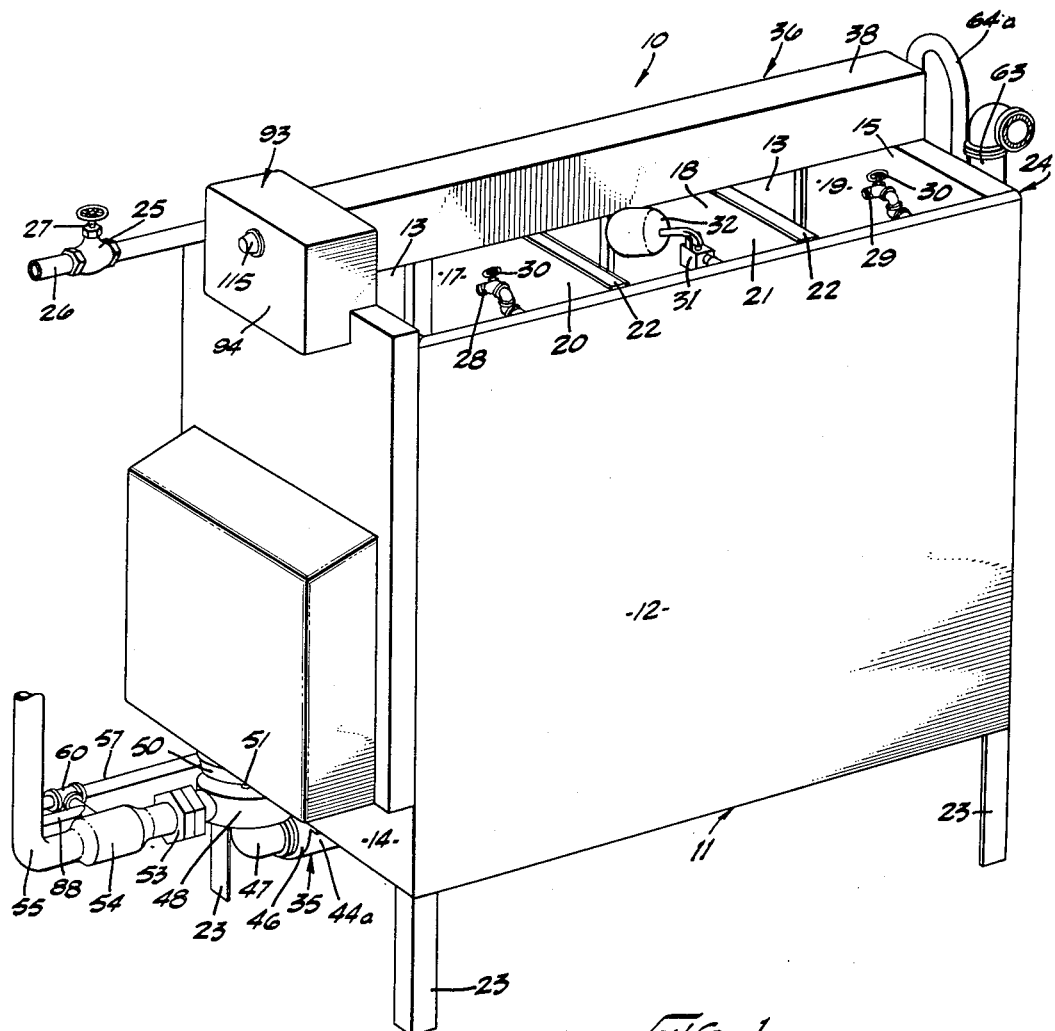
Fig. 1 is a perspective view of a machine embodying the principles of the present invention interconnected in a piping network, with parts removed.
Figure 5:
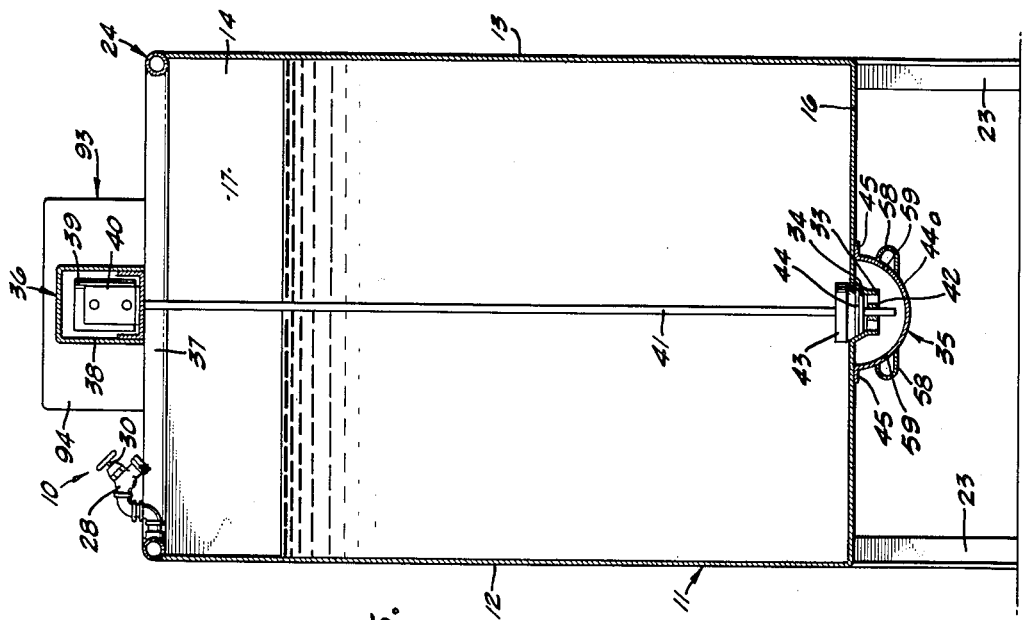
Fig. 5 is a transverse sectional view taken on line 5—5 of Fig. 3.
Figure 4:
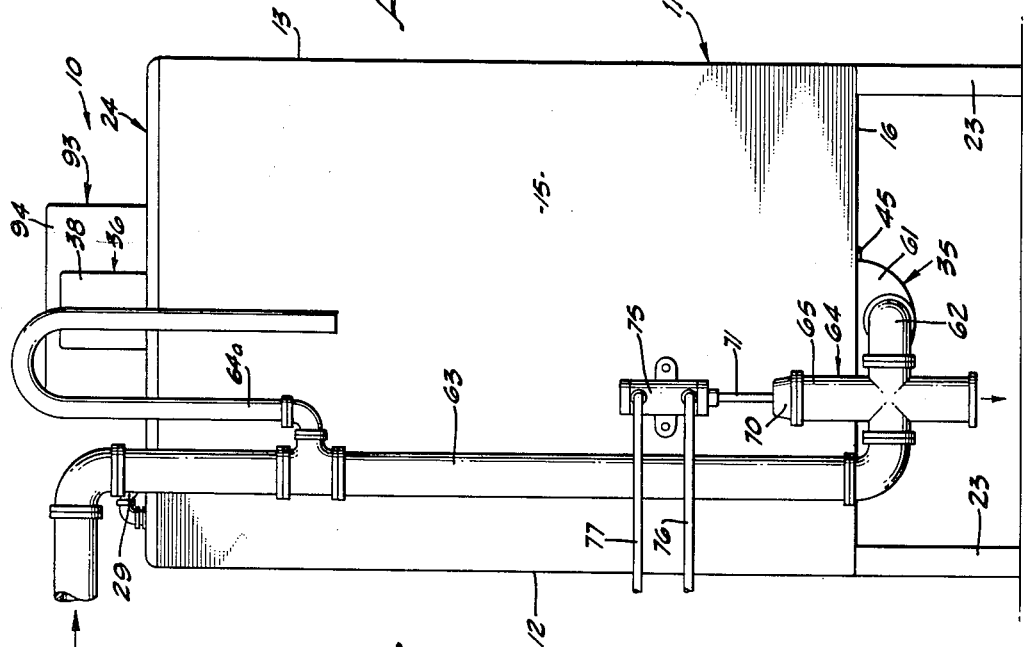
Fig. 4 is an end view looking in the direction of line 4—4 of Fig. 3, with parts removed.

This application is a continuation of application Serial No. 481,674, filed January 13, 1955, now abandoned.

Referring to the drawings, the number 10 broadly represents a preferred embodiment of a machine for cleaning a fixed pipe line circuit or network such as, for instance, a pipe line network found in a dairy or milk manufacturing plant. The machine consists of a tank 11, preferably formed of stainless steel, which has opposite side sections 12 and 13, opposite end sections 14 and 15, and a bottom section 16. The tank 11 is divided into three smaller tanks 17, 18, and 19 by means of baffles 20 and 21, each of the baffles 20 and 21 being reinforced adjacent its upper edge by means of a suitable stainless steel angular-shaped bar 22. Tank 11 is preferably provided with downwardly depending legs 23 at its respective corners for supporting the same in an elevated position with respect to the floor or other supporting surface.

The upper edge of each of the end sections 14 and 15 and each of the side sections 12 and 13 has secured thereto a pipe ring 24, one leg of which extends outwardly and connects by means of a pipe fitting 25, to a pipe 26 which in turn leads from a suitable water supply. Pipe fitting 25 has a suitable valve enclosed therein of any well known or suitable construction which is controlled by a manually operative valve stem 27 for controlling the flow of fluid from pipe 26 into pipe 24, one leg of pipe ring 24 being provided with a pair of faucets 28 and 29, each of which is controlled by a manually operative stem 30, faucet 28 directing water into tank 17 and faucet 29 directing water into tank 19. This leg of the pipe ring 24 is also provided with a float controlled faucet 31 of any suitable or well known construction which is operatively responsive to a float 32. It will be appreciated, therefore, assuming firstly that valve stem 27 is in its open position, that each of tanks 17 and 19 can be filled with water by manually moving valve stem 30 of each of faucets 28 and 29 into its open position. When the required amount of water has been allowed to fall in each of these tanks, the operator can stop the supply by moving each of the valve stems 30 into their closed positions. The float 32 is so designed as to maintain the water level in tank 18 at a predetermined level, and as will be more fully appreciated hereinafter, when water is taken from tank 18 for circulation through the piping network, the float 32 immediately opens faucet 31 for refilling tank 18 to the predetermined control level.

Floor 16 of each of the tanks 17, 18 and 19 has an exit pipe section 33 fixed therein, each of which is formed with a downwardly converging seating section 34 and each of the pipe sections 33 opening into a mixing manifold 35.

A sheet metal housing 36 is carried on the top of the tank 11 and includes a floor section 37 and a cover 38. A solenoid 39 is supported from the floor 37 by means of a bracket 40 above each of the tanks 17, 18 and 19, and each of the solenoids 39 is provided with a rod 41 which extends downwardly through a suitable opening formed in floor 37 into the respective tanks 17, 18 and 19. A spider 42 is centered in each of the pipe sections 33 and each of the rods 41 is of a length sufficient to extend downwardly through an opening formed in the respective spider so as to center the respective rod for up and down movement upon the solenoid being energized or de-energized as will be more fully appreciated hereinafter. A piston 43 encircles each of the rods adjacent its lower end and each of the pistons has a sealing ring 44 which seats against the seating section 34 of each of the respective pipe sections 33 for sealing the same when the solenoid is in its de-energized condition. It will be appreciated, therefore, that the weight of the fluid in the tanks 17, 18 and 19 acting upon the pistons 43 will tend to force the pistons 43 into sealing relationship with respect to their associated seating surface 34 and that the pistons 43 are movable into their unsealing positions only upon energization of the respective solenoids.

The mixing manifold 35 is preferably defined by a sheet metal section 44a substantially semicircular in cross section and provided with angularly disposed side sections 45 which are fixed as by welding to the floor 16 of tank 11. The outlet end of manifold 35 is closed by a suitable pipe receiving section 46, and a pipe fitting 47, preferably in the form of an elbow, connects the mixing manifold 35 with the inlet opening of a pump 48, pump 48 being of any suitable or well-known construction and preferably of the centrifugal type, the parts of which are preferably formed of stainless steel. The pump 48 is carried by means of suitable mounting brackets 49 by the end section 14 of tank 11 and a suitable electric motor 50 having a power shaft 51 is carried by mounting brackets 52 by section 14 adjacent pump 48 connected for driving the pump impeller in a manner well known in the art. The discharge end of the pump 48 is connected by a pipe fitting 53 which in turn discharges into a mixing bulb 54 of an interconnected pipe 55, mixing bulb 54 being welded as at 56 to the circumferential surface of pipe 53 at a point remote from its end.

A supply of steam is carried by a suitable pipe 57 to a steam manifold 58 on opposite sides of section 44a, suitable openings 59 being provided into mixing manifold 35 for interconnecting the steam manifold with the mixing manifold. As will be more fully appreciated hereinafter, the admission of steam into the mixing manifold 35 effects thorough mixing of the cleaning solutions before the same are pumped by pump 48 through the pipe circuit or network to be cleaned. To further effect thorough mixing of the cleaning solutions, a T-section 60 is interconnected in the steam pipe line 57 and leads into the bulb 54 for causing further mixing of the solution as it enters pipe 55 from pipe 53.

The other end of mixing manifold 35 is connected to the return end of the pipe circuit being cleaned. More particularly, the return end of the mixing manifold has fixed thereto a suitable pipe receiving section 61 which receives a return pipe 62 which in turn is in the form of an elbow. The elbow 62 is connected to a return pipe 63 by means of a pipe valve 64 which is effective for causing the fluid returning by way of pipe 63 to pass through the valve into elbow 62 and consequently into the mixing manifold or to be discharged downwardly through the valve onto the floor and into a suitable drain, and a venting section 64a is interconnected in return pipe 63 for well known purposes.

The valve 64 includes a vertically disposed cylinder section 65 and a cross leg 66 which is interconnected between the return pipes 63 and 62. A piston 67 is slidably disposed in the cylinder 65 and has formed therein an opening 68 which registers with the inner diameter of cross leg 66 when the piston 67 is moved into one position relative to cylinder 65, and a sealing end portion 69 for directing the flow of fluid from pipe 63 downwardly through cylinder 65 when the piston is moved into its other position relative to cylinder 65, see Figs. 7 and 8. A suitable end cap 70 is fixed to the top of cylinder 65 and a rod 71 is fixed to piston 67 and slidably received in opening 72 formed in cap 70. A suitable seal 73 is positioned in the cap 70 for well known purposes. A piston 74 is fixed to the other end of rod 71 and is slidably received in a slave clylinder 75, see Fig. 9, the slave cylinder 75 being connected at its opposite ends by means of conduits 76 and 77 to the opposite ends of a master cylinder 78. Compressed air from any suitable source not a part of the present invention is directed into master cylinder 78 by means of a conduit 79, and a valve member 80 connected to a rod 81 is slidably positioned in the cylinder 78. A solenoid of any suitable construction 82 receives rod 81 and is instrumental in moving valve member 80 axially in cylinder 78. When the solenoid 82 is de-energized, the valve member 80 assumes the position shown in Fig. 9 and the compressed air is directed to the upper end of piston 74 for moving the piston into the position shown in Fig. 8, the air on the underside of the piston 74 being forced through conduit 76 of the master cylinder 78 and out through a port 83. When the solenoid 82 is energized, the valve member 80 is moved to the opposite end of the master cylinder 83 and the compressed air directed by way of conduit 76 to the opposite end of piston 74 for moving the valve into position shown in Fig. 7, the air on the upper side of the piston 74 being forced through conduit 77 into cylinder 78 and out through port 84. It will be appreciated, therefore, that the fluid being returned from the fixed pipe line being cleaned by way of pipe 63 can be either directed into manifold 35 when the valve is in the position shown in Fig. 8 or caused to be spilled upon the floor when the valve is in the position shown in Fig. 7, these valve positions being controlled by solenoid 82.

As previously suggested, the steam is directed into mixing manifold 35 and bulb 54 by way of pipe 57 and the admission of steam is controlled by means of a solenoid 84. More specifically, a valve 85 is positioned in the pipe line 57 and slidably receives a solenoid rod 86 which has fixed to the end thereof a piston 87. The piston 87 is so located when solenoid 84 is de-energized as to interrupt the flow of steam through pipe 57 and consequently to mixing bulb 54 and mixing manifold 35. Upon the solenoid 84 being energized, the rod 86 moves the piston 87 axially in cylinder 85 a distance sufficient to allow the flow of steam to pass through valve 85 for effecting mixing of the cleaning solutions in bulb 54 and in mixing manifold 35.

Compressed air is directed through a pipe 88 into the mixing bulb 54 by way of section 60 for chasing or pushing the previous solutions out of the line being cleaned after the pump has been stopped so that the next solution pumped through the line is not diluted or contaminated in any way with the previous solution and for speeding up the solution changeover time. The admission of air into mixing bulb 54 is also solenoid controlled. More specifically, a valve cylinder 89 is positioned in the pipe line 88 and slidably receives therein a piston 90 which is connected to one end of a rod 91 of a solenoid 92. The piston 90 when the solenoid is de-energized is positioned so as to interrupt the flow of compressed air into the mixing bulb 54 and upon energization of solenoid 92 the piston 90 is caused to move axially in cylinder 89 sufficiently to permit the flow of compressed air from its source into the mixing bulb for effecting the previously mentioned functions. The air used is preferably previously put through a filtering system of the type generally used for the air agitation of milk to be sure that no contamination will be carried into the fixed pipe line by the air medium.

Each of the previously described solenoids together with the corresponding function effected by the respective solenoid and its related parts is controlled by a sequence timer broadly indicated by number 93 which is enclosed in a substantially waterproof stainless steel housing 94. The sequence timer comprises an electric clock timer 95 which rotates a control shaft 96. A series of adjustable timer cams 97, 98, 99, 100, 101, 102, 103, and 104 are received in spaced relationship on the control shaft 96 and are effective for closing the circuit of corresponding normally open microswitches 105, 106, 107, 108, 109, 110, 111 and 112, in predetermined timed sequences upon rotation of shaft 96 by timer clock 95. One terminal of the clock timer 95 is connected by a suitable lead 113 to a source of electrical energy and the other terminal of clock timer 95 is connected by lead 114 to one terminal of microswitch 105 and to one terminal of a normally open switch button 115. The other terminal of switch button 115 is connected to a suitable lead 116 connected with the source of electrical energy which in turn is also connected to the other terminal of microswitch 105 and to one terminal of each of the microswitches 106, 107, 108, 109, 110, 111 and 112. When switch button 115 is pushed so as to close the circuit to clock timer 96, disc 97, which controls the clock timer, is so formed as to immediately close microswitch 105 so that switch button 115 resuming its normally open position will not break the circuit to clock timer 95. The disc 97 is so chosen as to cause the clock timer 95 to be energized for a predetermined length of time, microswitch 105 breaking the circuit to the clock timer at the end of this predetermined time. One terminal of each of the solenoids 39 and of solenoids 82, 84 and 92 are connected to a lead 117 which in turn is connected to lead 113, and the other terminal of each of the solenoids 39 and of the solenoids 82, 84 and 92 are connected by leads 117a to the other terminal of its associated microswitch so that each of the solenoids is energized when its respective cam disc causes its associated microswitch to close its electrical circuit. The pump 48 is under the control of cam disc 100 and its associated microswitch 108 and the other terminal of switch 108 is connected by a lead 118 to one terminal of the motor and the other terminal of the motor is connected by a lead 119 to the source of electrical energy so that the electric motor is energized and the pump put into operation upon cam disc 100 reacting against switch 108 so as to close the circuit.

In operation, the machine can be set to automatically circulate through the piping network to be cleaned cleaning solutions and/or water in accordance with any predetermined or desired cycle or sequence of operation. After the cleaning cycle is established by the operator or by the proper public health officials, the operator merely connects the machine into the piping network to be cleaned, presses the starter button, and the machine automatically goes through all the pre-set cycles and shuts itself off upon completion of these operations. A typical cleaning cycle or operation could be as follows:

The tank 17 is first filled with a predetermined amount of water to which is added a suitable cleaning detergent and the tank 19 is also filled with a predetermined amount of water to which is added a concentrated chlorine solution. The water in tank 18 is maintained at a predetermined level by means of float 32. The cams on control shaft 96 are so adjusted relative to their associated switches that immediately after the machine is turned on or the circuit to clock timer 95 is closed by switch button 115, cam 102 closes switch 110 so as to energize the solenoid 39 associated with water tank 18 and pump cam 100 closes switch 108 so as to energize motor 50, the water flowing from tank 18 into mixing manifold 35 being pumped through the pipe network being cleaned by pump 48. Inasmuch as the first flushing of the pipe network picks up a considerable amount of objectionable matter, the cam 104 is also adjusted so as to simultaneously close switch 112 and to consequently energize solenoid 82 so as to cause the piston 67 to move into the position shown in Fig. 7. The water being pumped through the piping network will accordingly be directed downwardly through cylinder 65 of valve 64 and into a drain or the like. Cams 102, 100 and 104 are so formed as to permit a predetermined amount of water to be flushed through the pipe network. The next operation usually entails flushing the system with a detergent solution. Accordingly, cam 101 is so adjusted to close switch 109 after switch 110 and 112 are permitted to assume their normally open position, the closing of switch 109 energizing the solenoid 39 associated with the detergent tank 17. Simultaneously, cam 98 closes switch 106 causing solenoid 84 to be energized, this permitting the steam to pass into the mixing bulb 54 and mixing manifold 35. As the detergent solution flows into the manifold, the same is thoroughly mixed by steam entering through ports 59 and as the detergent solution is pumped by pump 48 through pipe 53 into pipe 55, it is again thoroughly mixed in the mixing bulb 54. Upon de-energization of solenoid 82 the valve member 67 is permitted to assume its normal position shown in Fig. 8 so that the detergent solution returning to the machine is permitted to flow again into the mixing manifold 35. Sufficient detergent solution is carried in tank 17 to completely fill the pipe network being cleaned and after the detergent solution has been circulated through the piping for a predetermined length of time, the cam 100 de-energizes the motor 50 and the cam 99 simultaneously closes its associated switch 107, releasing thereby compressed air into the mixing bulb 54 upon energization of solenoid 92, which compressed air chases the detergent solution through the pipe network and once again into the mixing manifold 35 and tank 17. After substantially all of the detergent solution has once again returned into tank 17, the detergent tank solenoid 39 is de-energized and the piston 43 returned to its sealing position. The next cycle of operation usually entails another flushing with water which is similar to the previously described water flushing operation and after this second water flushing cycle the disc 103 is set so as to close switch 111 to energize the solenoid associated with the chlorine tank 19. The sequence timer is also set so as to simultaneously energize motor 50 and solenoid 82 in a manner substantially identical with the previously described cycle with respect to the detergent solution and solenoid 92 is also energized in substantially the same manner for directing compressed air into bulb 54 for chasing the solution through the piping and back once again into the chlorine tank 19. The pipe network after this cycle of operation can either be flushed once again with water or the disc 97 can be set for de-energizing the timer 95 upon completion of the chlorine cycle.

It will be appreciated that almost any desired cycle of operation can be accomplished by proper adjustment of the sequence timer and that the proper cycle of operation is best determined experimentally, due consideration being given to the type of pipe line being cleaned, the use to which the pipe line is put and the specifications and requirements of the particular health authorities involved. It will be appreciated, however, that the machine is very versatile, that it effects a complete cycle of cleaning operations automatically, that once the sequence timer has been adjusted for effecting a predetermined cycle or sequence of operations, the pipe network will be subject to the same cleaning cycle day after day, and that an operator does not have to be in attendance during the cleaning operation except to start the machine.

What is claimed is:

1. A machine for interconnection in a circuitous pipe line for effecting circulation through said pipe line of a plurality of cleaning solutions in predetermined time sequences comprising a plurality of tanks for holding said solutions, each of said tanks having formed in the floor thereof a plunger-controlled opening, a manifold fixed to each of said tanks and interconnecting each of said openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, and a sequence timer operatively connected with said plunger-controlled openings, said pump and said valve for unsealing said plunger control openings and for actuating said pump and said valve according to a predetermined time sequence.

2. A machine for interconnection in a circuitous pipe line for effecting circualtion through said pipe line of a plurality of cleaning solutions in predetermined time sequences comprising a plurality of tanks for holding said solution, each of said tanks having formed in the floor thereof a plunger controlled opening, a manifold fixed to each of said tanks and interconnecting each of said openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, means for directing steam into said manifold for thoroughly mixing the solution therein, valve means operatively connected with said steam directing means for interrupting the flow of steam into said manifold, and a sequence timer operatively connected with said plunger controlled openings, said pump, said valve means, and said valve for unsealing said plunger control openings and for actuating said pump, said valve means, and said valve according to a predetermined time sequence.

3. A machine for interconnection in a circuitous pipe line for effecting circulation through said pipe line of a plurality of cleaning solutions in predetermined time sequences comprising a plurality of tanks for holding said solution, each of said tanks having formed in the floor thereof a plunger controlled opening, a manifold fixed to each of said tanks and interconnecting each of said openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, means for directing compressed air into said pipe line adjacent said one end thereof for chasing the solution through said pipe line, valve means operatively connected with said air directing means for interrupting the flow of air into said pipe line, and a sequence timer operatively connected with said plunger controlled openings, said pump, said valve means, and said valve for unsealing said plunger control openings and for actuating said pump, said valve means and said valve according to a predetermined time sequence.

4. A machine for interconnection in a circuitous pipe line for effecting circulation through said pipe line of a plurality of cleaning solutions in predetermined time sequences comprising a plurality of tanks for holding said solution, each of said tanks having formed in the floor thereof a plunger controlled opening, a manifold fixed to each of said tanks and interconnecting each of said openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, means for directing steam into said manifold for thoroughly mixing the solution therein, valve means operatively connected with said steam directing means for interrupting the flow of steam into said manifold, means for directing compressed air into said pipe line adjacent said one end thereof for chasing the solution through said pipe line, valve means operatively connected with said air directing means for interrupting the flow of air into said pipe line, and a sequence timer operatively connected with said plunger controlled openings, said pump, said valve means and said valve for unsealing said plunger control openings and for actuating said pump, said valve means and said valve according to a predetermined time sequence.

5. A machine for interconnection in a circuitous pipe line for effecting circulation through said pipe line of a plurality of cleaning solutions in predetermined time sequences comprising a plurality of tanks for holding said solution, each of said tanks having formed in the floor thereof a plunger controlled opening, a manifold fixed to each of said tanks and interconnecting each of said openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, means for directing steam into said pipe line adjacent said one end thereof for thoroughly mixing the solution passing therethrough, valve means operatively connected with said steam directing means for interrupting the flow of steam into said pipe line, and a sequence timer operatively connected with said plunger controlled openings, said pump, said valve means and said valve for unsealing said plunger control openings and for actuating said pump, valve means and said valve according to a predetermined time sequence.

6. A machine of the type described comprising a tank divided into a plurality of fluid-tight compartments, each of said compartments having an opening formed in the floor thereof, a manifold fixed to said tank and interconnecting each of said openings, plunger means operatively connected with each of said discharge openings for sealing or unsealing the same, timing means adapted to move said plunger means from sealing to unsealing positions in accordance with a preselected time sequence, a pump connected to the discharge end of said manifold, timing means for effecting operation of said pump in accordance with a preselected time sequence, a valve connected with the return end of said manifold and operable for directing the fluid returning by way of said valve either into said manifold or upon the floor, and timing means for effecting actuation of said valve according to a preselected time sequence.

7. A machine of the type described comprising a tank divided into a plurality of fluid tight compartments, each of said compartments having a discharge opening formed in the floor thereof, a manifold fixed under said tank and interconnected with each of said openings, plunger means operatively connected with said discharge openings for sealing and unsealing the same, timing means adapted to move said plunger means from sealing to unsealing positions in accordance with a preselected time sequence, a pump connected to the discharge end of said manifold, timing means for effecting operation of said pump in accordance with a preselected time sequence, a valve connected with the return end of said manifold and operable for returning the fluid by way of said valve into said manifold or upon the floor, timing means for effecting actuation of said valve according to a preselected time sequence, means for directing steam into the manifold for thoroughly mixing the solutions directed therein, valve means included in said steam directing means and timing means for effecting actuation of said valve means according to a predetermined time sequence.

8. A machine for interconnection in a fixed pipe line comprising a tank, baffles for dividing said tank into a plurality of fluid-tight compartments, each of said compartments being adapted to hold a cleaning solution and each of said compartments having formed in the floor thereof a discharge opening, a solenoid responsive plunger operatively connected with the discharge opening of each of said compartments for sealing or unsealing said opening, a manifold fixed to said tank and interconnecting each of said discharge openings, an electrically-controlled pump interconnected between one end of said fixed pipe line and the discharge end of said manifold for forcing the fluid in said manifold through said fixed pipe line, a valve interconnecting the return end of said manifold with the other end of said fixed pipe line, said valve being solenoid controlled for directing the fluid returning to said valve into said manifold or upon the floor, and a sequence timer for energizing said solenoid responsive plungers, said solenoid responsive valve and said electrically responsive pump in predetermined timed sequences of operation for causing circulation through said fixed pipe line of the fluid carried in each of said compartments in accordance with a predetermined pattern of operation.

9. A machine for interconnection in a fixed pipe line comprising a tank, baffles for dividing said tank into a plurality of fluid-tight compartments, each of said compartments being adapted to hold a cleaning solution and each of said compartments having formed in the floor thereof a discharge opening, a solenoid responisive plunger operatively connected with the discharge opening of each of said compartments for sealing or unsealing said opening, a manifold fixed to said tank and interconnecting each of said discharge openings, a pump interconnected between one end of said fixed pipe line and the discharge end of said manifold for forcing the fluid in said manifold through said fixed pipe line, a motor for driving said pump, a valve interconnecting the return end of said manifold with the other end of said fixed pipe line, said valve being solenoid controlled for directing the fluid returning to said valve into said manifold or upon the floor, means for directing steam into said manifold for thoroughly mixing the solution therein, solenoid responsive valve means for interrupting the flow of steam into said manifold, a circuit for connecting each of said solenoid responsive plungers, said motor, said solenoid responsive valve, and said solenoid responsive valve means to a source of electrical energy, a switch in each of said circuits, and a sequence timer for actuating said switches for energizing said solenoid responsive plungers, said solenoid responsive valve, said solenoid responsive valve means and said motor in predetermined timed sequences of operation for causing circulation through said fixed pipe line of the fluid carried in each of said compartments in accordance with a predetermined pattern of operation.

10. A machine for interconnection in a fixed pipe line comprising a tank, baffles for dividing said tank into a plurality of fluid-tight compartments, each of said compartments being adapted to hold a cleaning solution and each of said compartments having formed in the floor thereof a discharge opening, a solenoid responsive plunger operatively connected with the discharge opening of each of said compartments for sealing or unsealing said opening, a manifold fixed to said tank and interconnecting each of said discharge openings, a pump interconnected between one end of said fixed pipe line and the discharge end of said manifold for forcing the fluid in said manifold through said fixed pipe line, a motor for driving said pump, a valve interconnecting the return end of said manifold with the other end of said fixed pipe line, said valve being solenoid controlled for directing the fluid returning to said valve into said manifold or upon the floor, means for directing compressed air into said pipe line adjacent said pump for chasing the solution therethrough, solenoid responsive valve means for interrupting the flow of compressed air into said pipe line, a circuit for connecting each of said solenoid responsive plungers, said motor, said solenoid responsive valve, and said solenoid responsive valve means to a source of electrical energy, a switch in each of said circuits, and a sequence timer for actuating said switches for energizing said solenoid responsive plungers, said solenoid responsive valve, said solenoid responsive valve means, and said motor in predetermined timed sequences of operation for causing circulation through said fixed pipe line of the fluid carried in each of said compartments in accordance with a predetermined pattern of operation.

11. A machine for interconnection in a fixed pipe line comprising a tank, baffles for dividing said tank into a plurality of fluid-tight compartments, each of said compartments being adapted to hold a cleaning solution and each of said compartments having formed in the floor thereof a discharge opening, a solenoid responsive plunger operatively connected with the discharge opening of each of said compartments for sealing or unsealing said opening, a manifold fixed to said tank and interconnecting each of said discharge openings, a pump interconnected between one end of said fixed pipe line and the discharge end of said manifold for forcing the fluid in said manifold through said fixed pipe line, a motor for driving said pump, a valve interconnecting the return end of said manifold with the other end of said fixed pipe line, said valve being solenoid controlled for directing the fluid returning to said valve into said manifold or upon the floor, means for directing steam into said manifold for thoroughly mixing the solution therein, means for directing compressed air into said pipe line adjacent said pump for chasing the solution therethrough, solenoid responsive valve means operatively connected with each of said directing means for interrupting the flow therethrough, a circuit for connecting each of said solenoid responsive plungers, said motor, said solenoid responsive valve, and said solenoid responsive valve means to a source of electrical energy, a switch in each of said circuits, and a sequence timer having a control shaft, a plurality of adjustable cams on said control shaft and operatively connected with said switches, and means for rotating said shaft at a predetermined timed rate of speed for actuating said switches for energizing said solenoid responsive plungers, said solenoid responsive valve, said solenoid responsive valve means, and said motor in predetermined timed sequences of operation for causing circulation through said fixed pipe line of the fluid carried in each of said compartments in accordance with the predetermined pattern of operation.

12. A machine for interconnection in a circuitous pipe line for effecting circulation in said pipe line of a plurality of cleaning solutions in predetermined time sequences comprising a plurality of tanks for holding said solutions, each of said tanks having formed therein an exit opening, means operatively connected with each of said exit openings for sealing the same, a manifold for interconnecting each of said exit openings, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, and a sequence timer operatively connected with said means, said pump, and said valve for unsealing said exit openings and for actuating said pump and said valve according to a predetermined time sequence.

13. A machine for interconnection in a circuitous pipe line for effecting circulation in said pipe line of a plurality of cleaning solutions in predetermined time sequences comprising a plurality of tanks for holding said solution, each of said tanks having formed therein an exit opening, means operatively connected with each of said exit openings for sealing the same, a manifold interconnecting each of said exit openings, a pump interconnecting one end of said pipe line to the discharge end of said manifold and operable for directing the solution in said manifold through said pipe line, the other end of said pipe line being connected with the return end of said manifold, and a sequence timer operatively connected with said means and said pump for unsealing said exit openings and for actuating said pump according to a predetermined time sequence.

14. A machine for interconnection in a circuitous pipe line for effecting circulation in said pipe line of a solution comprising a tank for holding said solution, said tank having formed therein an exit opening, means operatively connected with said exit opening for sealing the same, a manifold interconnected with said exit opening, a pump interconnecting one end of said pipe line to the discharge end of said manifold and operable for directing the solution in said manifold through said pipe line, the other end of said pipe line being connected with the return end of said manifold, and a sequence timer operatively connected with said means and said pump, for unsealing said exit opening and for actuating said pump according to a predetermined time sequence.

15. A machine for interconnection in a circuitous pipe line for effecting circulation in said pipe line of a solution comprising a tank for holding said solution, said tank having formed therein an exit opening, means operatively connected with said exit opening for sealing the same, a manifold interconnected with said exit opening, a pump interconnecting one end of said pipe line to the discharge end of said manifold and operable for directing the solution in said manifold through said pipe line, a valve for interconnecting the other end of said pipe line with the return end of said manifold, said valve being operable for directing the returning solution into the manifold or upon the floor, and a sequence timer operatively connected with said means, said pump, and said valve for unsealing said exit opening and for actuating said pump and said valve according to a predetermined time sequence.

References Cited in the file of this patent

UNITED STATES PATENTS

| | | |
|---|---|---|
| 1,741,329 | Montgomery | Dec. 31, 1929 |
| 2,193,051 | Wood | Mar. 12, 1940 |
| 2,558,628 | Redin | June 26, 1951 |